C. E. WOOLF.
SHEARS.
APPLICATION FILED JULY 10, 1916.
1,210,129.
Patented Dec. 26, 1916.
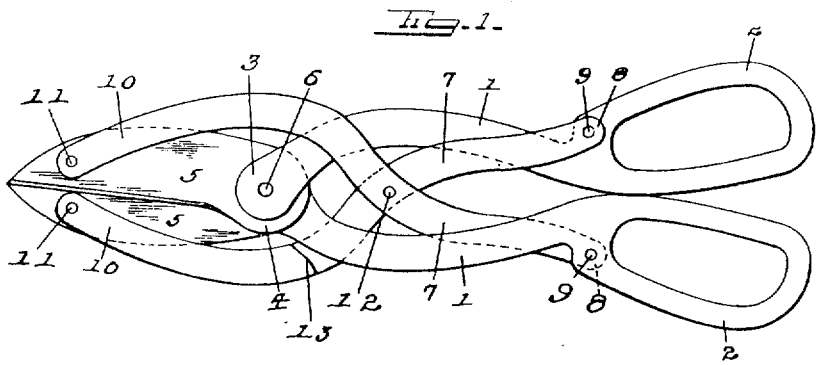
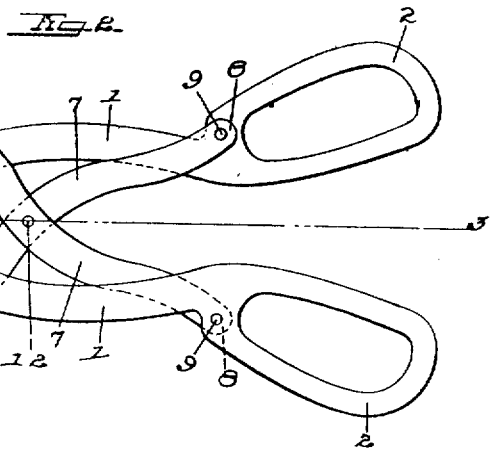
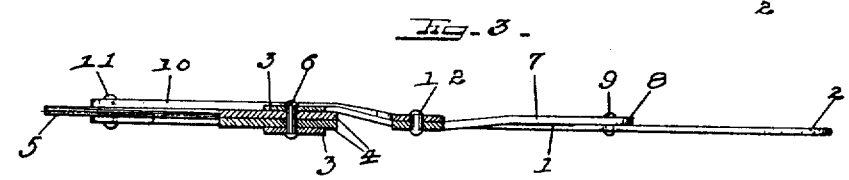
Charles E. Woolf,
Inventor
By
Attorney
Witnesses
Ira M. Jones
M. E. Moore

UNITED STATES PATENT OFFICE.

CHARLES E. WOOLF, OF WYNNEWOOD, PENNSYLVANIA.

SHEARS.

1,210,129.  Specification of Letters Patent.  Patented Dec. 26, 1916.

Application filed July 10, 1916. Serial No. 108,410.

*To all whom it may concern:*

Be it known that I, CHARLES E. WOOLF, a citizen of the United States, residing at Wynnewood, in the county of Montgomery and State of Pennsylvania, have invented certain new and useful Improvements in Shears, of which the following is a specification.

My invention relates to improvements in shears which while particularly constructed for use in trimming hedges or as pruning shears, may be used for any purpose where they would operate in an efficient manner.

The primary object of my invention is the provision of shears which will have greatly increased cutting power or action with the expenditure of very little human effort, thus obtaining a high degree of efficiency without tiring the user.

Another object of my invention is the provision of shears which can be operated with ease and which will insure the cutting of an increased amount of material with a clean, smooth cut without much strain or wear upon the implement.

A further object of my invention is the provision of shears, which will be easy to operate, which will be light in weight and very durable in construction, which may be manufactured at a low price, and which from every point of view will be thoroughly efficient and practical.

With the above and other objects in view which will appear as the description proceeds, the invention consists in the novel construction, combination and arrangement of parts, hereinafter described and claimed, it being understood that changes in the precise embodiment of the invention herein disclosed can be made without departing from the spirit of the invention.

In the accompanying drawing, I have illustrated one complete example of the physical embodiment of my invention constructed according to the best mode I have so far devised for the practical application of the principles of my invention.

Figure 1 represents a top plan view of my shears with the parts in closed position. Fig. 2 represents a similar view with the shears open for cutting, and Fig. 3 represents a sectional view taken on the line 3—3 of Fig. 2.

My shears are of extremely simple construction and may be said to consist of the pair of handles 1, having their outer free ends formed with finger loops 2, and their inner ends 3 engaging and pivoted to the inner ends 4 of the pair of cutting blades 5, by means of the pin or stud 6; and the pair of crossed oppositely curved levers or fulcrums 7 having their ends 8 pivoted at 9 to the finger loops 2 and their other ends 10 forked and pivoted by the pins 11 at or near the outer free ends of the blades 5, said levers 7 being pivoted by means of the pin or stud 12 at their point of intersection and formed with the guiding shoulder or abutment 13 for the handles 5.

From the foregoing description taken in connection with the drawings the manner of using my shears will be readily understood, and it will be apparent that the opening of the handles also opens the cutting blades, and that the closing of the handles causes the blades to cut the material or object with a clean, smooth shear cut, this being accomplished with ease and rapidity.

It will also be apparent that by my construction I secure a very strong and powerful cutting action with the expenditure of very little force or effort and that in this manner the shears are capable of cutting thick substance or material in a rapid and efficient manner with little effort and without tiring the user which is a great advantage.

It will also be understood that my shears, while possessing the advantages stated, are very simple, durable and inexpensive, will withstand very hard usage and may be employed for many purposes, and generally are desirable and practical.

I claim:—

1. The shears herein described, consisting of the handles having finger loops formed on their outer free ends, the pair of cutting blades having their inner ends pivoted to the inner ends of said handles, and a pair of oppositely curved levers connected to said blades at or near their outer free ends and to said handles near their outer free ends.

2. The shears herein described, consisting of the handles having finger loops, the pair of cutting blades having their inner ends pivoted to the inner ends of said handles, and a pair of crossed oppositely curved levers having one end connected at or near the outer free end of said blades and the other connected to said handles at or near their outer free ends.

3. The shears herein described, consisting of the handles having finger loops, the pair of cutting blades having their inner ends pivoted to the inner ends of said handles, and a pair of crossed oppositely curved levers having their ends pivoted to the blades near their outer free ends and to the handles near their outer free ends, said crossed oppositely curved levers being pivoted at their point of intersection.

4. The combination with a pair of cutting blades and handles having a common pivot center, of a pair of crossed levers each pivoted at one end to a cutting blade and at the other end to a handle.

In testimony whereof I affix my signature in the presence of two witnesses.

CHARLES E. WOOLF.

Witnesses:
FANNY E. BISHOP,
LOUISE H. KAIN.

Copies of this patent may be obtained for five cents each, by addressing the "Commissioner of Patents, Washington, D. C."